United States Patent
Fernando et al.

(10) Patent No.: US 9,995,416 B2
(45) Date of Patent: Jun. 12, 2018

(54) FLEXIBLE PIPE BODY LAYER AND METHOD OF PRODUCING SAME

(71) Applicant: Wellstream International Limited, Newcastle-upon-Tyne (GB)

(72) Inventors: Upul Shanthilal Fernando, Sheffield (GB); Neville Dodds, Newcastle-upon-Tyne (GB)

(73) Assignee: GE Oil & Gas UK Limited, Nailsea, Bristol (GB)

( * ) Notice: Subject to any disclaimer, the term of this patent is extended or adjusted under 35 U.S.C. 154(b) by 148 days.

(21) Appl. No.: 14/046,668

(22) Filed: Oct. 4, 2013

(65) Prior Publication Data
US 2014/0116563 A1 May 1, 2014

(30) Foreign Application Priority Data
Oct. 25, 2012 (EP) .................................... 12189968

(51) Int. Cl.
| F16L 11/00 | (2006.01) |
| F16L 9/14 | (2006.01) |
| B32B 7/02 | (2006.01) |
| B32B 1/08 | (2006.01) |
| B32B 27/08 | (2006.01) |
| B32B 27/28 | (2006.01) |
| B32B 27/30 | (2006.01) |
| B32B 27/32 | (2006.01) |
| B32B 27/36 | (2006.01) |
| B32B 27/40 | (2006.01) |
| E21B 17/01 | (2006.01) |
| F16L 11/08 | (2006.01) |

(52) U.S. Cl.
CPC ................ *F16L 11/00* (2013.01); *B32B 1/08* (2013.01); *B32B 7/02* (2013.01); *B32B 27/08* (2013.01); *B32B 27/285* (2013.01); *B32B 27/308* (2013.01); *B32B 27/32* (2013.01); *B32B 27/36* (2013.01); *B32B 27/40* (2013.01); *B32B 2307/51* (2013.01); *B32B 2597/00* (2013.01); *E21B 17/01* (2013.01); *F16L 11/083* (2013.01)

(58) Field of Classification Search
CPC ................................... F16L 11/00; B32B 1/08
USPC .................................................. 138/137, 141
See application file for complete search history.

(56) References Cited

U.S. PATENT DOCUMENTS 4,706,713 A    11/1987 Sadamitsu et al.
5,469,892 A *  11/1995 Noone ..................... F16L 9/12
                                                      138/121

(Continued)

FOREIGN PATENT DOCUMENTS

CN    101970923 A    2/2011
EP       1266749 A1   12/2002
(Continued)

OTHER PUBLICATIONS http://scitation.aip.org/docserver/fulltext/aip/proceeding/aipcp/1599/10.1063/1.4876807/1.4876807.pdf?expires=1470765428&id=id&accname=2110913&checksum=7AEF269E601C5E9DDAAF8CA0710F1EBE.*

(Continued)

*Primary Examiner* — Vishal Pancholi (57) ABSTRACT

A flexible pipe body layer and method of producing a flexible pipe body layer are disclosed. The method includes coextruding an inner sub-layer and an outer sub-layer, wherein the inner sub-layer and outer sub-layer comprise a polymer, and wherein the inner sub-layer has a lower modulus of elasticity than the outer sub-layer.

9 Claims, 4 Drawing Sheets

(56) References Cited

U.S. PATENT DOCUMENTS

| | | | |
|---|---|---|---|
| 5,499,661 A | 3/1996 | Odru et al. | |
| 5,520,223 A * | 5/1996 | Iorio | B29C 63/486 |
| | | | 138/137 |
| 5,562,127 A | 10/1996 | Fanselow et al. | |
| 5,743,304 A * | 4/1998 | Mitchell | B32B 1/08 |
| | | | 138/137 |
| 5,876,548 A * | 3/1999 | Strassel | F16L 9/147 |
| | | | 156/244.13 |
| 5,932,307 A * | 8/1999 | Ryan | A61L 29/041 |
| | | | 138/137 |
| 5,934,335 A | 8/1999 | Hardy | |
| 6,455,118 B1 | 9/2002 | Dewimille et al. | |
| 8,124,208 B2 * | 2/2012 | Sumi | B32B 1/08 |
| | | | 138/137 |
| 2002/0036020 A1 * | 3/2002 | Noone | B32B 1/08 |
| | | | 138/137 |
| 2002/0189699 A1 * | 12/2002 | Wilson | B32B 1/08 |
| | | | 138/137 |
| 2003/0099799 A1 | 5/2003 | Koike et al. | |
| 2003/0213524 A1 | 11/2003 | Henry et al. | |
| 2005/0221033 A1 | 10/2005 | Procida | |
| 2009/0151805 A1 | 6/2009 | Martino et al. | |
| 2009/0301594 A1 * | 12/2009 | Raudies | F16L 11/083 |
| | | | 138/126 |
| 2010/0230954 A1 * | 9/2010 | Buchanan | B01L 3/565 |
| | | | 285/123.1 |
| 2011/0030831 A1 * | 2/2011 | Clements | E21B 17/015 |
| | | | 138/109 |
| 2012/0261017 A1 | 10/2012 | Christensen et al. | |
| 2013/0011595 A1 * | 1/2013 | Martino | B32B 1/08 |
| | | | 428/35.8 |
| 2013/0025734 A1 * | 1/2013 | Kuhmann | B32B 1/08 |
| | | | 138/137 |

FOREIGN PATENT DOCUMENTS

| | | |
|---|---|---|
| GB | 2318399 A | 4/1998 |
| WO | WO2007/096589 A1 | 8/2007 |
| WO | WO2011/128201 A1 | 10/2011 |
| WO | WO2011/141033 A1 | 11/2011 |

OTHER PUBLICATIONS

Search Report from the European Patent Office for corresponding European Application No. EP13188980.0-1308, dated Feb. 6, 2014, 9 pages.

Search Report from the European Patent Office for corresponding European Application No. EP12189968.6-1308, dated Feb. 26, 2013, 9 pages.

English Translation of First Office Action and Search Report from State Intellectual Property Office of People's Republic of China for corresponding Chinese Application No. 201310504055.1, dated Sep. 27, 2016, 11 pages.

"Communication —European Search Report" from the European Patent Office for European Application No. EP13188980.0—1102, dated Feb. 15, 2006, 7 pages.

* cited by examiner

FLEXIBLE PIPE BODY LAYER AND METHOD OF PRODUCING SAME

CROSS REFERENCE TO RELATED APPLICATION

This application claims priority to European patent no. EP12189968.6, filed Oct. 25, 2012, which is incorporated herein by reference.

FIELD

The present invention relates to a flexible pipe body and method of producing the same. In particular, but not exclusively, the present invention relates to the use of polymers including thermoplastic materials for forming one or more layer of flexible pipe body, and a method of treatment to enhance the characteristics of the polymer.

BACKGROUND

Traditionally flexible pipe is utilised to transport production fluids, such as oil and/or gas and/or water, from one location to another. Flexible pipe is particularly useful in connecting a sub-sea location (which may be deep underwater, say 1000 meters or more) to a sea level location. The pipe may have an internal diameter of typically up to around 0.6 meters. Flexible pipe is generally formed as an assembly of a flexible pipe body and one or more end fittings. The pipe body is typically formed as a combination of layered materials that form a pressure-containing conduit. The pipe structure allows large deflections without causing bending stresses that impair the pipe's functionality over its lifetime. The pipe body is generally built up as a combined structure including metallic and polymer layers.

Unbonded flexible pipe has been used for deep water (less than 3,300 feet (1,005.84 meters)) and ultra deep water (greater than 3,300 feet) developments. It is the increasing demand for oil which is causing exploration to occur at greater and greater depths where environmental factors are more extreme. For example in such deep and ultra-deep water environments ocean floor temperature increases the risk of production fluids cooling to a temperature that may lead to pipe blockage. Increased depths also increase the pressure associated with the environment in which the flexible pipe must operate. As a result the need for high levels of performance from the layers of the flexible pipe body is increased.

Flexible pipe may also be used for shallow water applications (for example less than around 500 meters depth) or even for shore (overland) applications.

In flexible pipes there are often used polymer layers, such as PVDF (polyvinylidene fluoride), that may be formed by extrusion. Most polymers will have a certain maximum allowable strain above which the risk of damage to the material is much greater. In flexible pipes where a polymer layer lies adjacent an armour layer (such as a polymer barrier layer adjacent a metallic pressure armour layer), the polymer layer may be subjected to quite severe non-uniform, highly localised strain. This is because the armour layer is usually formed from interlocking wires of certain cross section, and there are certain gaps between adjacent windings. The polymer layer tends to deform and creep into the gaps when under pressure.

U.S. Pat. No. 4,706,713 describes a pipe having a PVDF layer.

In accordance with industry regulations, all flexible pipe structures must undergo a factory acceptance test (FAT) prior to sale. This involves pressurising a pipe bore with a fluid such as water at 1.5 times the usual pressure of use. The water is thus a pressurising medium.

The application of internal pressure (i.e. pressure from within the bore) to the pipe produces radial expansion in all layers and this is when a polymer layer undergoes deformation and tends to creep into the gaps of an overlying armour layer. At high pressures (about 8000 psi/55 MPa or more), the resultant strain distribution within the polymer layer can be highly localised at the areas around the gaps, and the polymer material may deform by cavitation rather than plastic flow. This can in turn result in the formation of microcrazing or microcracking on the radially inner surface of the polymer layer. During any subsequent loading (such as the loading experienced during normal use in transporting production fluids) this microcrazing may then extend to form longer/deeper cracks throughout the polymer layer. This increases the risk of failure of the polymer layer and may ultimately lead to loss of pressure containment, having an adverse effect on the lifetime of a flexible pipe.

SUMMARY

According to a first aspect of the present invention there is provided a method of producing a tubular layer for a flexible pipe body, comprising coextruding an inner sub-layer and an outer sub-layer, wherein the inner sub-layer and outer sub-layer comprise a polymer, and wherein the inner sub-layer has a lower modulus of elasticity than the outer sub-layer.

According to a second aspect of the present invention there is provided a tubular layer for a flexible pipe body comprising an inner sub-layer and an outer sub-layer, wherein the inner sub-layer and outer sub-layer comprise a polymer, and wherein the inner sub-layer has a lower modulus of elasticity than the outer sub-layer.

According to a third aspect of the present invention there is provided a method substantially as herein described with reference to the drawings.

According to a fourth aspect of the present invention there is provided a tubular layer substantially as herein described with reference to the drawings.

Certain embodiments of the invention provide the advantage that a flexible pipe body layer is provided that has been formed to reduce, inhibit or prevent the occurrence of strain localisation upon pressurisation and possible microcrazing in the layer.

Certain embodiments of the invention provide the advantage that a method of forming a flexible pipe body layer is provided to reduce, inhibit or prevent the occurrence of strain localisation or pressurisation and possible microcrazing in the layer, and that can be conveniently incorporated into current pipe manufacturing processes.

Certain embodiments provide the advantage that ingress of a polymer layer into gaps in an overlying layer is reduced, inhibited or prevented.

The foregoing and other objects, features, and advantages of the invention will become more apparent from the following detailed description, which proceeds with reference to the accompanying figures.

BRIEF DESCRIPTION OF THE DRAWINGS

In the drawings like reference numerals refer to like parts.

DETAILED DESCRIPTION

Figure 1:
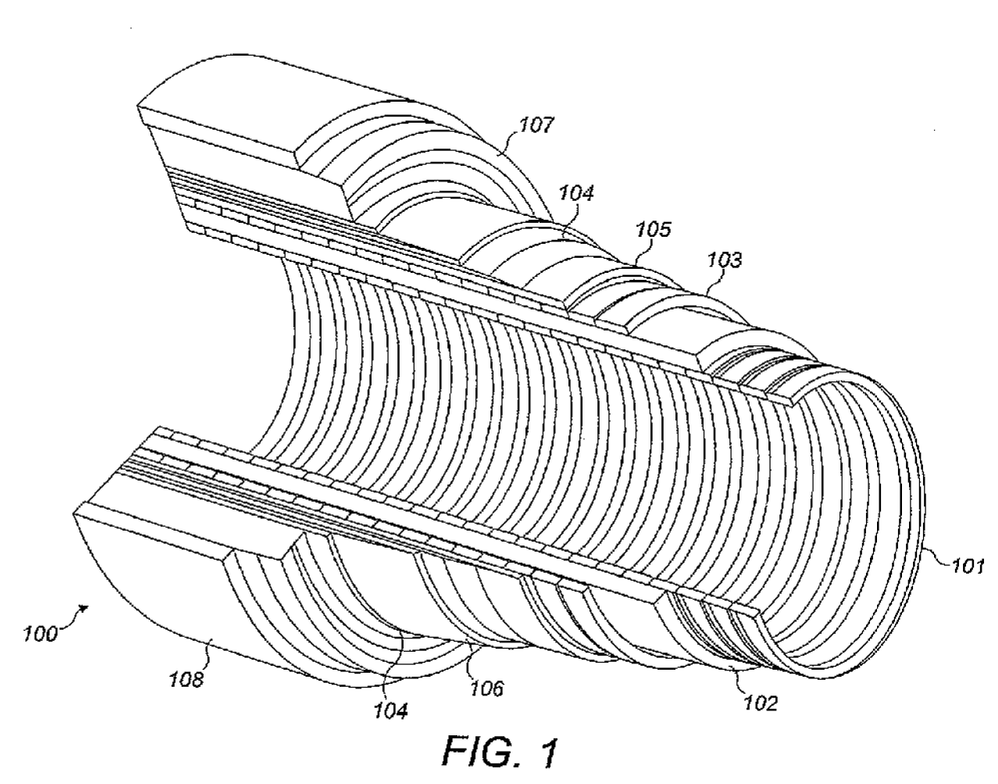
FIG. 1 illustrates a flexible pipe body.

Throughout this description, reference will be made to a flexible pipe. It will be understood that a flexible pipe is an assembly of a portion of a pipe body and one or more end fittings in each of which a respective end of the pipe body is terminated. FIG. 1 illustrates how pipe body 100 is formed in accordance with an embodiment of the present invention from a combination of layered materials that form a pressure-containing conduit. Although a number of particular layers are illustrated in FIG. 1, it is to be understood that the present invention is broadly applicable to coaxial pipe body structures including two or more layers manufactured from a variety of possible materials. It is to be further noted that the layer thicknesses are shown for illustrative purposes only.

As illustrated in FIG. 1, a pipe body includes an optional innermost carcass layer 101. The carcass provides an interlocked construction that can be used as the innermost layer to prevent, totally or partially, collapse of an internal pressure sheath 102 due to pipe decompression, external pressure, and tensile armour pressure and mechanical crushing loads. It will be appreciated that certain embodiments of the present invention are applicable to 'smooth bore' operations (i.e. without a carcass) as well as such 'rough bore' applications (with a carcass).

The internal pressure sheath 102 acts as a fluid retaining layer and comprises a polymer layer that ensures internal fluid integrity. It is to be understood that this layer may itself comprise a number of unbounded sub-layers. It will be appreciated that when the optional carcass layer is utilised the internal pressure sheath is often referred to by those skilled in the art as a barrier layer. In operation without such a carcass (so-called smooth bore operation) the internal pressure sheath may be referred to as a liner.

In addition, and not shown in FIG. 1, there may also be included a wear layer between the carcass layer and internal pressure sheath. The wear layer may be a polymer layer intended to help prevent wear between the carcass layer (which may have a non-smooth surface) and the barrier layer.

An optional pressure armour layer 103 is a structural layer that increases the resistance of the flexible pipe to internal and external pressure and mechanical crushing loads. The layer also structurally supports the internal pressure sheath, and typically consists of an interlocked construction of wires with a lay angle close to 90°.

The flexible pipe body also includes an optional first tensile armour layer 105 and optional second tensile armour layer 106. Each tensile armour layer is used to sustain tensile loads and internal pressure. The tensile armour layer is often formed from a plurality of metallic wires (to impart strength to the layer) that are located over an inner layer and are helically wound along the length of the pipe at a lay angle typically between about 10° to 55°. The tensile armour layers are often counter-wound in pairs.

The flexible pipe body shown also includes optional layers of tape 104 which help contain underlying layers and to some extent prevent abrasion between adjacent layers.

The flexible pipe body also typically includes optional layers of insulation 107 and an outer sheath 108, which comprises a polymer layer used to protect the pipe against penetration of seawater and other external environments, corrosion, abrasion and mechanical damage.

Each flexible pipe comprises at least one portion, sometimes referred to as a segment or section of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
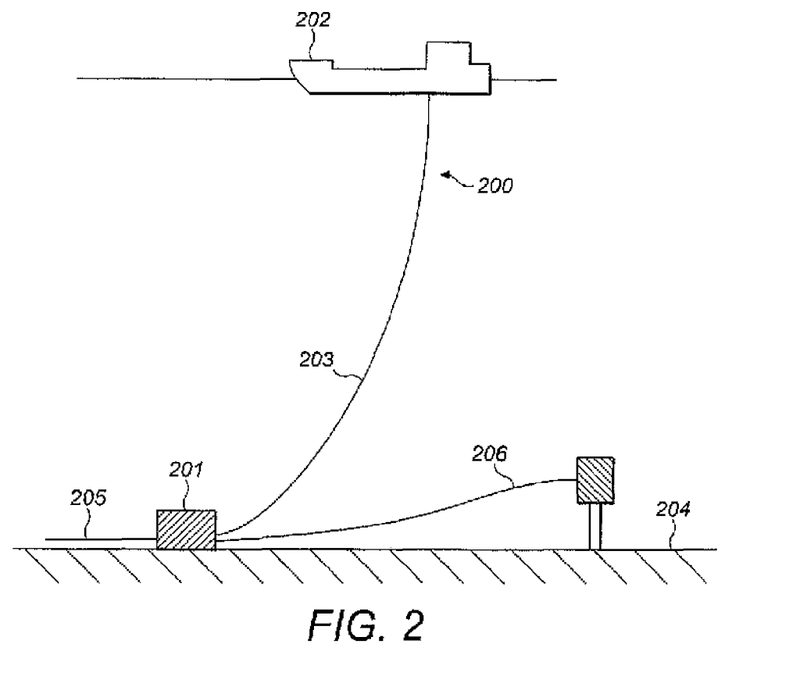
FIG. 2 illustrates a riser assembly.

FIG. 2 illustrates a riser assembly 200 suitable for transporting production fluid such as oil and/or gas and/or water from a sub-sea location 201 to a floating facility 202. For example, in FIG. 2 the sub-sea location 201 includes a sub-sea flow line. The flexible flow line 205 comprises a flexible pipe, wholly or in part, resting on the sea floor 204 or buried below the sea floor and used in a static application. The floating facility may be provided by a platform and/or buoy or, as illustrated in FIG. 2, a ship. The riser assembly 200 is provided as a flexible riser, that is to say a flexible pipe 203 connecting the ship to the sea floor installation. The flexible pipe may be in segments of flexible pipe body with connecting end fittings.

It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes).

FIG. 2 also illustrates how portions of flexible pipe can be utilised as a flow line 205 or jumper 206.

Figure 3:
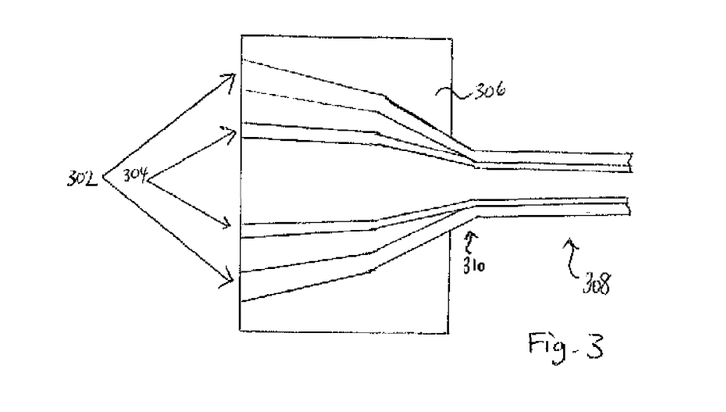
FIG. 3 illustrates a schematic representation of a method and apparatus of the invention.

FIG. 3 illustrates a manufacturing method according to an embodiment of the present invention. The invention is related to the production of a polymer layer or layers for flexible pipe bodies. The polymer layer may be any of a liner, barrier layer, or other polymer layer within the structure of a pipe body. As such the polymer layer may be formed over a mandrel (to become the innermost layer of a flexible pipe body) or over another layer of flexible pipe body.

The polymer layer is formed by an extrusion process. The extrusion tooling used will be suitable to form generally coaxial, nominally circular layers exhibiting limited ovality. An extruder head, tip and die components may fit around existing pipe body layers that may pass through these extruder tools to provide a surface onto which to extrude, and can be used to direct multiple coaxial layers of material on to the pipe. Without pre-existing layers of pipe body, the extrudates will form a liner onto which other layers may be applied.

As shown in FIG. 3, a first polymer material in a flowable (molten) state 302 is directed into a die 306 alongside a second polymer material in a flowable (molten) state 304. The die 306 is configured to accept the two polymer materials and extrude the materials to form a (single) tubular layer 308. The materials 302, 304 are thus coextruded. The material 302 is used to form an outer sub-layer and the material 304 is used to form an inner sub-layer.

In this embodiment, the materials 302, 304 are both forms of PVDF. The process temperature is around 180 to 250 U to melt the PVDF materials. The tubular layer may be formed by moving the mandrel (not shown) in a horizontal direction in the direction of the pipe's longitudinal axis. This allows the flowable material to cover the mandrel and form the tubular layer. Alternatively the mandrel may remain still and the extruder moved to cover the die in the polymer materials.

The material 302 may be a "60512 PVDF" that is known and used as a material for making layers of a flexible pipe in the industry (available from Solvay Speciality Polymers), or another suitable PVDF. 60512 PVDF has a modulus of elasticity of about 1300 MPa. The material 304 may be a PVDF-based material or alloy of PVDF having a lower modulus of elasticity of approximately 650 MPa. Indeed the lower modulus material could even have a modulus as low as 240 MPa.

In this example the material 302 is extruded to a final thickness of around 4 mm. The material 304 is extruded to a final thickness of around 0.5 mm. Aptly, the material 302 could be extruded to a final thickness of between around 4 mm to around 12 mm and the material 304 extruded to a final thickness of between around 0.1 mm to around 10 mm.

Figure 4:
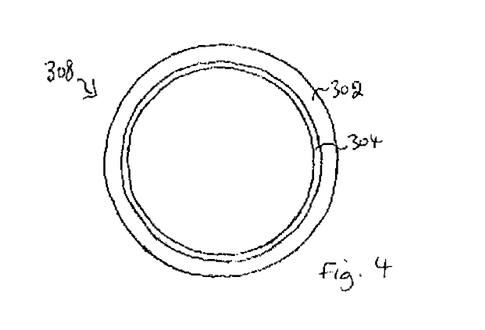
FIG. 4 illustrates a cross-section of a tubular layer.

A cross-section of the extruded tubular layer 308 is shown in FIG. 4 (not to scale). The materials 302, 304 have sufficient compatibility that as they are brought together by the die 306 in the region 310, the two melt streams will bond together at an outer surface of the innermost material 304 and an inner surface of the outermost material 302. There is a degree of diffusion between the two polymers to allow formation of an inter-molecular bond (or true thermoplastic weld). However the two materials 302, 304 do not mix completely to define a new material with uniform properties. Rather, a single tubular layer is formed having an inner region or sub-layer and an outer region or sub-layer. The inner region has the properties of the first material 302 and the outer region has the properties of the second material 304. The inner region is chemically bonded to the outer region at the interface there between. It is noted that to allow for such bonding between the first and second polymer materials, compatibility is required. This is likely to be achieved by the two materials being modified grades of the same base polymer, for example.

The tubular layer may then be passed through a cooling bath (not shown) to help the polymer materials harden.

Additional layer of flexible pipe body may then be provided over the tubular layer in a manner known in the art. The layers may be any or all of those as described above with reference to FIG. 1.

Upon formation of the completed flexible pipe body, this may be immediately or later followed by a FAT. The formed pipe body may have one or two end fittings attached to form a flexible pipe in a known manner.

Figure 5:
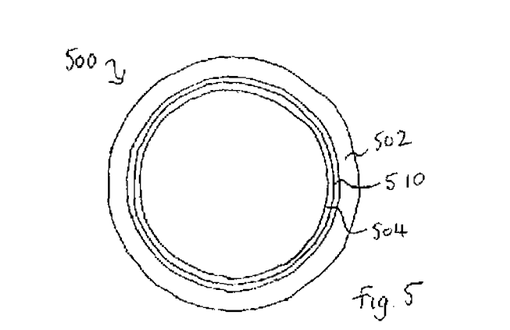
FIG. 5 illustrates a cross-section of another tubular layer.

A further embodiment of the invention is shown in the cross-sectional view of FIG. 5. A polymer layer 500 is produced by co-extrusion of two polymer materials in a similar way to the method of FIG. 3. The layer 500 has an inner sub-layer 504 of a first material and an outer sub-layer 502 of a second material. However, the materials in this embodiment are not directly compatible to form a bond with each other. Instead, a tie layer 510 is used, which is individually compatible with both the first material 502 and the material 504. The tie layer material may be acrylates, thermoplastic aliphatic polyester based polyurethanes, modified polyolefins or low molecular weight PVDF, for example. These may be used to tie a PVDF to a PFA or FEP, for example.

The tie layer may be introduced between the inner and outer sub-layers 502, 504 by co-extrusion.

The inner sub-layer 504 has a lower modulus of elasticity than the outer sub-layer 502.

Figure 6:
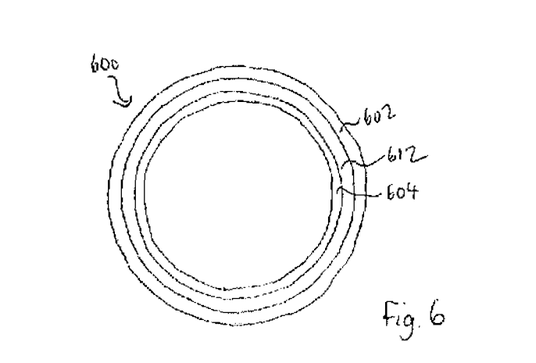
FIG. 6 illustrates a cross-section of yet another tubular layer.

A yet further embodiment of the invention is shown in the cross-sectional view of FIG. 6. A polymer layer 600 is produced by co-extrusion of polymer materials in a similar way to the method of FIG. 3. However, a further, intermediate sub-layer 612 is provided between the innermost sub-layer 604 and the outermost sub-layer 602. The inner sub-layer 604 has a lower modulus of elasticity than the intermediate sub-layer 612, and the intermediate sub-layer 612 has a lower modulus of elasticity than the outer sub-layer 602. As such, a triple extrusion is performed. With this arrangement an increased resistance to localised strain throughout the thickness of the polymer layer may be achieved.

An optional and additional step that may be performed after the forming of the tubular layer 308, 500 or 600 is vacuum sizing of the extruded tubular layer. Vacuum sizing is itself a known technique in which the outer diameter of the pipe layer is calibrated. This may be achieved by the use of a vacuum to draw the inner region of the tubular layer to a predetermined diameter. Alternatively a positive pressure may be applied from within the bore of the tubular layer to push the layer towards a restrictive device for limiting the maximum outer diameter of the layer.

It has been found by the inventors that, surprisingly, by forming a polymer layer for a pipe body having a radially inner portion that is relatively softer than a radially outer portion, microcrazing in the layer during later pressurisation of the flexible pipe body is reduced or prevented (e.g. during a FAT or when the pipe body is in use to transport production fluids).

The relatively softer material at the radially inner surface area provides increased flexibility to the material under extremes of pressure from inside the pipe, as that same pressure causes the polymer material at the radially outer surface area to move into any gaps that are present between windings of an overlying armour layer (or similar). The polymer layer radially outer surface will inevitably flow partially into the gaps under the pressure in the pipe, however the radially inner surface with the lower modulus is able to deform sufficiently without cavitation or cracking and under a relatively low stress. Once the polymer has moved a certain amount into the gaps it can move no further without an additional increase in pressure (which is not permissible due to design factors) or temperature (which will change the stress and creep characteristics of the material and will not be seen until the material is in service). So, the polymer remains in that position through FAT cycles, and that consequently controls the strain in the polymer. Therefore, areas of the polymeric layer, which may have been subject to high localised strain under high pressure (from the FAT or in lower temperature use) in known pipe arrangements due to the proximity to gaps, are not subject to such high strain in further use. That is, even when the pipe body undergoes high pressure in a FAT or use, the strain levels are not as high as other known arrangements. This has proved to significantly reduce or completely prevent any microcrazing in the polymeric layer during its future use after the treatment stage, including during a FAT and use in transporting production fluids.

It is to be noted that a relatively softer surface portion of a polymer layer may be seen to weaken the properties of the polymer layer. However, this surface portion may be only a relatively small proportion of the full width of the cross-section. For example, a portion of the polymer layer may have a cross-sectional width of only 0.1 mm thick, or 0.5 mm thick, or 1 mm thick, for example. The remaining portion of polymer layer, for example 5 mm thick, or 7 mm thick, or 12 mm thick, will provide full strength and sufficient to adequately perform the function of a fluid retaining layer. It will be appreciated that precise thicknesses and materials will depend upon the specific parameters of use and can be determined by one skilled in the art.

It has also been found by the inventors that whilst an inner surface region of a polymer layer having a low elastic modulus (compared helps to prevent strain localisation upon pressurisation, the outer surface portion of the polymer layer may be advantageously made from a high elastic modulus polymer. This helps to resist creep of the polymer into any gaps of an overlying armour layer, for example.

Figure 7:
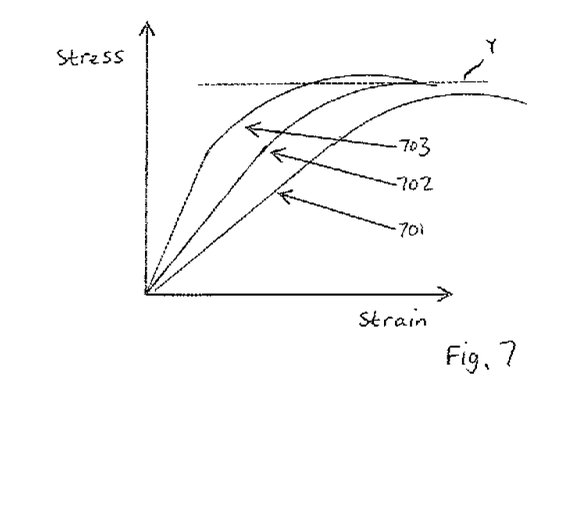
FIG. 7 shows a graph of the stress-strain relationship of PVDF materials.

FIG. 7 shows a graph of the true stress strain curve for PVDF. The 3 curves 701, 702, 703 illustrate the stress-strain relationship for 3 forms of PVDF. The centre curve 702 is the data for a nominal "60512 PVDF" that is known and used as a material for making layers of a flexible pipe in the industry (available from Solvay Speciality Polymers). This PVDF has a modulus of elasticity in the region of 1300 MPa. The curve 703 is a high modulus grade of PVDF type material, e.g. a derivative of Kynar® 700 series from Arkema, having a modulus of elasticity of, for example, around 2600 MPa. The curve 701 is a low modulus grade of PVDF, for example a low molecular weight or chemically plasticised type material such as PFA having a modulus of elasticity of, for example, around 650 MPa. The linear portion of the curves defines the elastic region of the materials, and the gradient of that linear portion gives the modulus of elasticity E.

The dashed line Y illustrates the yield strength of the nominal PVDF (curve 702). The yield strength of the other PVDF materials can be found by drawing a horizontal line at the peak of the curve.

The advantages of resistance to crazing are provided when the inner sub-layer has a lower modulus of elasticity than the outer sub-layer. As such, for example, the low modulus grade of PVDF may be used for the inner sub-layer and the nominal "60512 PVDF" may be used for the outer layer. Alternatively, the high modulus grade of PVDF may be used for the outer sub-layer.

It has been found that aptly a 50% decrease in modulus of elasticity from the outer sub-layer to the inner sub-layer provides a suitable difference in elasticity for providing resistance to crazing. I.e., the inner sub-layer has a modulus of elasticity 50% that of the outer sub-layer. Alternatively the inner sub-layer can have a modulus of elasticity of 60% or 70% or 80% of that of the outer sub-layer.

In addition, when the outer region (sub-layer) has a higher modulus of elasticity than the nominal PVDF, the resistance to ingress into gaps in an overlying layer is improved.

For PVDF materials, aptly the inner region may have a modulus of elasticity of around 900 MPa and the outer region have a modulus of elasticity of around 2000 MPa.

Furthermore, the inventors have found that a reduction in yield strength from the outer sub-layer to the inner sub-layer further enhances the effect on resistance to crazing. In particular larger differences in yield strength between materials of the inner and outer regions (compared to the nominal PVDF curve 702 of the stress-strain graph) lead to further improvements in resistance to crazing in the inner region and resistance to ingress into gaps of the outer region.

Figure 8:
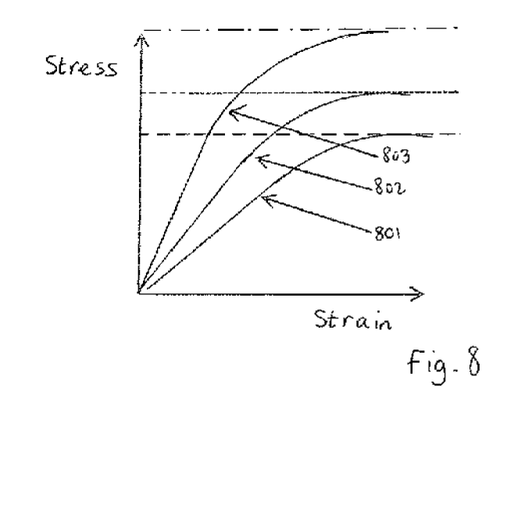
FIG. 8 illustrates a graph of the stress-strain relationship of other PVDF materials.

FIG. 8 shows a graph of a stress strain curve for 3 similar PVDF materials as shown in FIG. 7. However, the difference in yield strength between the materials has been modified by careful material selection and processing. That is, the difference in yield strength between material 801 and 802 is higher than the difference shown in FIG. 7 for material 701 and 702, the difference in yield strength between materials 802 and 803 is higher than the difference between materials 702 and 703, for example. The yield strength for the materials of curves 801, 802 and 803 are, for example, 25 MPa, 37 MPa and 60 MPa respectively. As can be seen in FIG. 7, the yield strengths have much less variability, with values of, for example, 35 MPa, 37 MPa, and 40 MPa.

Aptly, in addition to a 50% decrease in modulus of elasticity from the outer sub-layer to the inner sub-layer, a reduction in yield strength from the outer sub-layer to the inner sub-layer further enhances the effect on resistance to crazing. That is, the inner sub-layer has lower yield strength than the outer layer. Aptly a 30%, or 40% or even 70% reduction in yield strength from the outer sub-layer to the inner sub-layer may be employed.

For example, aptly, a 50% reduction in modulus of elasticity and a 30% reduction in yield strength (as a percentage change from the nominal PVDF value) provides benefits in terms of resistance to crazing. For example, when using a 'low' modulus grade PVDF for the inner sub-layer and the nominal "60512 PVDF" for the outer layer, the 'low' modulus grade PVDF has (1) a modulus of elasticity that is 50% lower than the 60512 PVDF, and (2) a yield strength that is 30% lower than the 60512 PVDF. Of course, other combinations of the materials as described may be used.

Alternatively, when performing a triple extrusion process (as described with respect to FIG. 6), the same values for modulus of elasticity and yield strength may apply between the innermost sub-layer and the outermost sub-layer, with the values for the intermediate sub-layer lying somewhere there between, respectively.

Also, by the same methods of calculation, a 100% increase in modulus of elasticity and an 80% increase in yield strength (as a percentage change from the nominal PVDF value) provides benefits in terms of resistance to ingress into gaps.

Various modifications to the detailed designs as described above are possible. For example, the materials and layer thicknesses used may be chosen according to the particular flexible pipe body materials, design, and future FAT test pressure.

The inner sub-layer may have any thickness, though practically it is useful for this layer to be relatively thin, such as 0.1 mm, 0.25 mm, 0.5 mm, or 1 mm, as this thickness is sufficient to provide the abovementioned advantages. The outer sub-layer will generally be relatively thicker to provide greater strength to the polymer layer. For example, the lower elastic modulus layer may be around 20% of the thickness of the higher elastic modulus layer, or even 15% or 10% or 5%.

The polymeric layer may be a fluoropolymer such as PVDF, a polyamide such as PA-12 or PA-11, another material such as polyphenylene sulphide (PPS), HDPE, PEEK, PEX, PFA, FEP, or a combination thereof, and may have additional components such as metallic wires or nanoparticles or glass microspheres dispersed therein. As such, the particular yield strength of the different materials may vary from those described above in relation to FIGS. 7 and 8.

With the above-described arrangement a flexible pipe body is provided that has been formed to reduce, inhibit or prevent the occurrence of strain localisation upon pressurisation and possible microcrazing in a polymer layer. The method of forming a flexible pipe body can be conveniently incorporated into current pipe manufacturing processes.

As such, the operating parameters of temperature and pressure of flexible pipes will be extended. That is, the pipes will be able to withstand increased operating pressures and lower temperatures compared to known arrangements. In addition, the lifetime of the flexible pipe may be extended compared to known pipes.

The invention may be of particular use for high pressure applications, such as use at 15000 psi or even higher up to 20000 psi (103 MPa to 138 MPa).

It is to be understood that the present invention is broadly applicable to coaxial pipe body structures including two or more layers manufactured from a variety of possible materials, for example including some or all of the layers as shown in FIG. 1.

All numerical values given above, for example for modulus of elasticity and yield strength, are taken at room temperature.

The disclosure encompasses a tubular layer formed by the method of the appended claims.

The disclosure encompasses a flexible pipe body comprising the tubular layer as claimed in any of the appended claims, and an armour layer and an outer sheath over the tubular layer. The disclosure encompasses a flexible pipe comprising such flexible pipe body and one or more end fittings connected to the pipe body.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

The invention claimed is:

1. A method of producing a flexible pipe body, comprising:
providing a tubular layer by coextruding an inner sub-layer and an outer sub-layer, wherein the inner sub-layer and outer sub-layer comprise a polymer, and wherein the inner sub-layer has a lower modulus of elasticity than the outer sub-layer, and wherein the inner sub-layer comprises a material having a yield strength that is between 30% and 70% lower than the outer sub-layer; and
wherein the inner sub-layer and outer sub-layer are chemically bonded together, directly during coextrusion, and wherein the inner sub-layer comprises PVDF, HDPE, PA-11, PA-12, PEX, PEEK, PPS, FEP or a mixture thereof, and the inner sub-layer and outer sub-layer comprise different grades or different forms of the same polymer, and
further comprising forming an armour layer over a radially outer portion of the tubular layer, the armour layer having gaps between adjacent windings thereof.

2. A method as claimed in claim 1 wherein the step of chemically bonding comprises bonding the inner sub-layer indirectly to the outer sub-layer via a tie layer.

3. A method as claimed in claim 1 further comprising co-extruding a further sub-layer between the inner and outer sub-layers, wherein the further sub-layer has a modulus of elasticity intermediate that of the inner and outer sub-layers.

4. A method of producing a flexible pipe body comprising providing the tubular layer as claimed in claim 1, and forming an outer sheath over the armour layer.

5. A method of producing a flexible pipe comprising providing a flexible pipe body as claimed in claim 4 and attaching one or more end fitting thereto.

6. A tubular layer for a flexible pipe body as claimed in claim 1, wherein the tubular layer for a flexible pipe body is capable of withstanding internal pressures of 55 MPa or more.

7. A method as claimed in claim 1, wherein the inner sub-layer and outer sub-layer are directly chemically bonded together.

8. A method as claimed in claim 7, wherein the inner sub-layer and outer sub-layer comprise different grades of the same polymer.

9. A method as claimed in claim 8, wherein the inner sub-layer and outer sub-layer comprise different grades of PVDF.

* * * * *